(12) United States Patent
Shimozono et al.

(10) Patent No.: US 6,183,906 B1
(45) Date of Patent: Feb. 6, 2001

(54) CADMIUM NEGATIVE ELECTRODE FOR ALKALINE STORAGE BATTERY AND MANUFACTURING METHOD OF THE SAME

(75) Inventors: Kazuki Shimozono, Mihara-gun; Toyoshige Muto, Sumoto; Masayuki Terasaka, Tsuna-gun, all of (JP)

(73) Assignee: Sanyo Electric Co., Ltd. (JP)

(*) Notice: Under 35 U.S.C. 154(b), the term of this patent shall be extended for 0 days.

(21) Appl. No.: 08/909,308

(22) Filed: Aug. 11, 1997

(30) Foreign Application Priority Data

Dec. 8, 1996 (JP) .................................................. 8-212878

(51) Int. Cl.$^7$ .................................................. H01M 4/48
(52) U.S. Cl. .................................. 429/206; 429/222
(58) Field of Search .................................. 429/206, 222

(56) References Cited

U.S. PATENT DOCUMENTS 4,338,385 * 7/1982 Ohya et al. ............................ 429/206
4,983,477 * 1/1991 Takemura et al. .................... 429/222
5,064,735 * 11/1991 Rampel et al. ....................... 429/206
5,102,754 * 4/1992 Corretja .............................. 429/222

FOREIGN PATENT DOCUMENTS 62-0211862   9/1987 (JP).
02-075156  * 3/1990 (JP).
3-192655    8/1991 (JP).

* cited by examiner

Primary Examiner—Carol Chaney
(74) Attorney, Agent, or Firm—Nixon & Vanderhye

(57) ABSTRACT

A cadmium negative electrode capable of enhancing a utilization rate of metallic cadmium contained therein as an active material in charged state. In the cadmium negative electrode, a mixture paste of a main active material in form of cadmium oxide or cadmium hydroxide and metallic cadmium powder containing yttrium component is deposited on a metallic active material retention substrate.

3 Claims, 2 Drawing Sheets

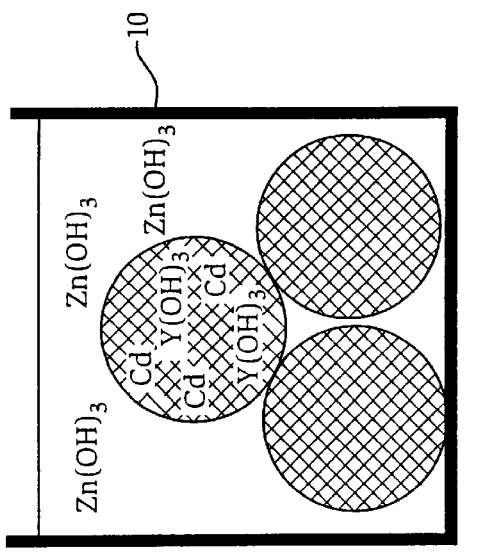
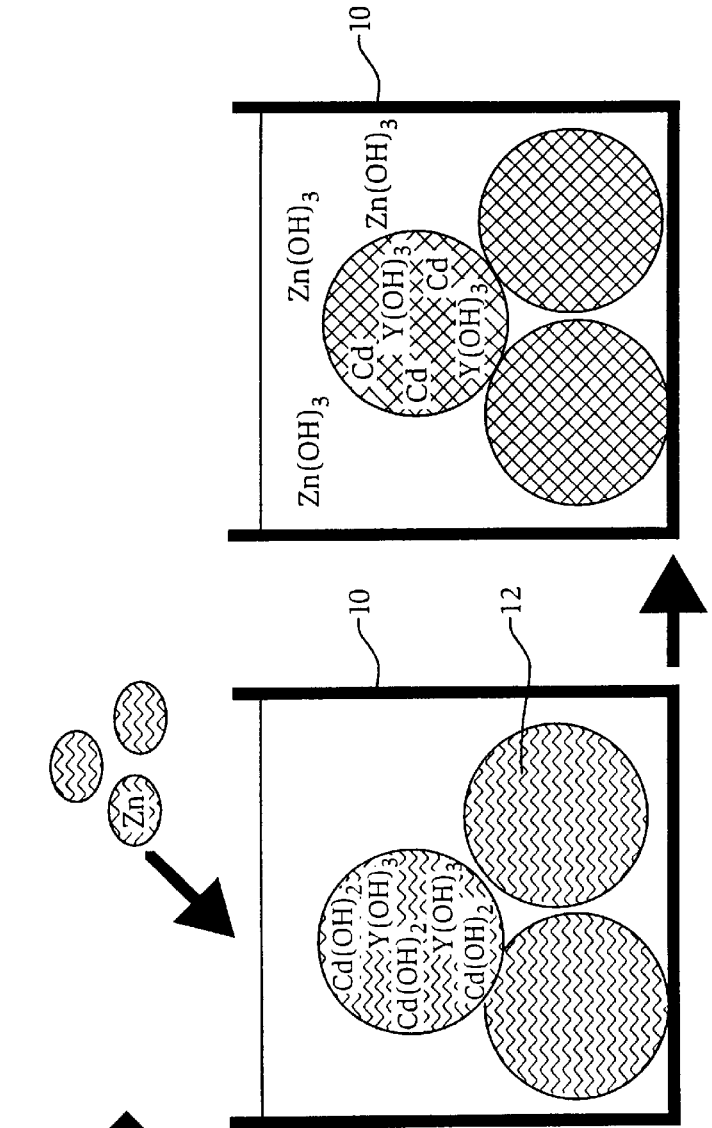
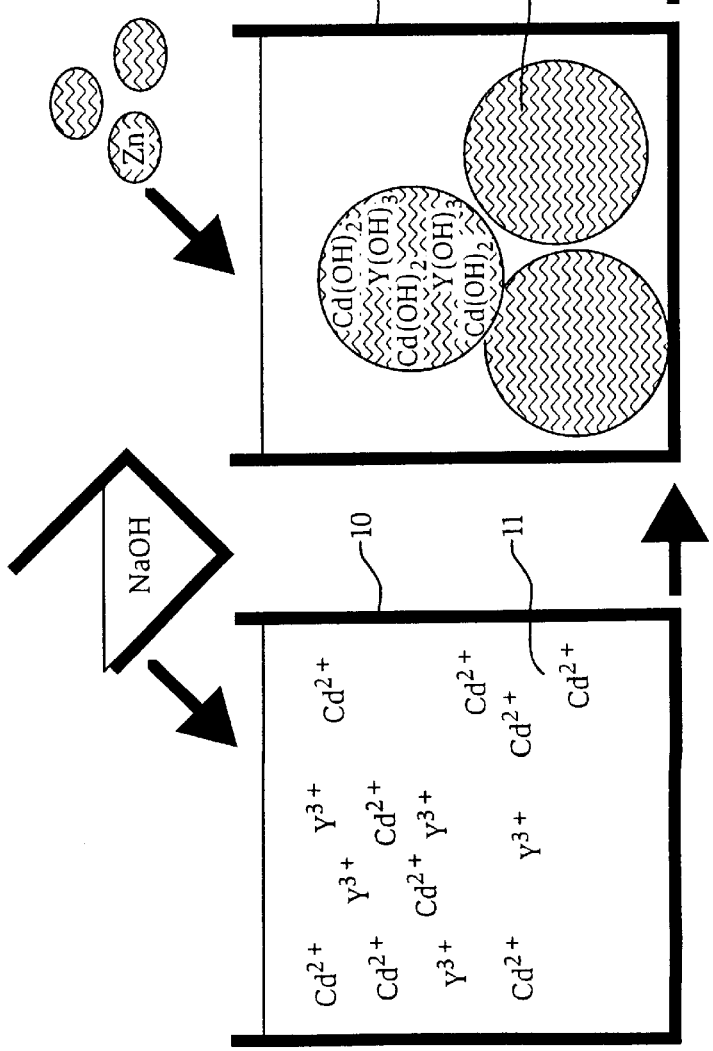

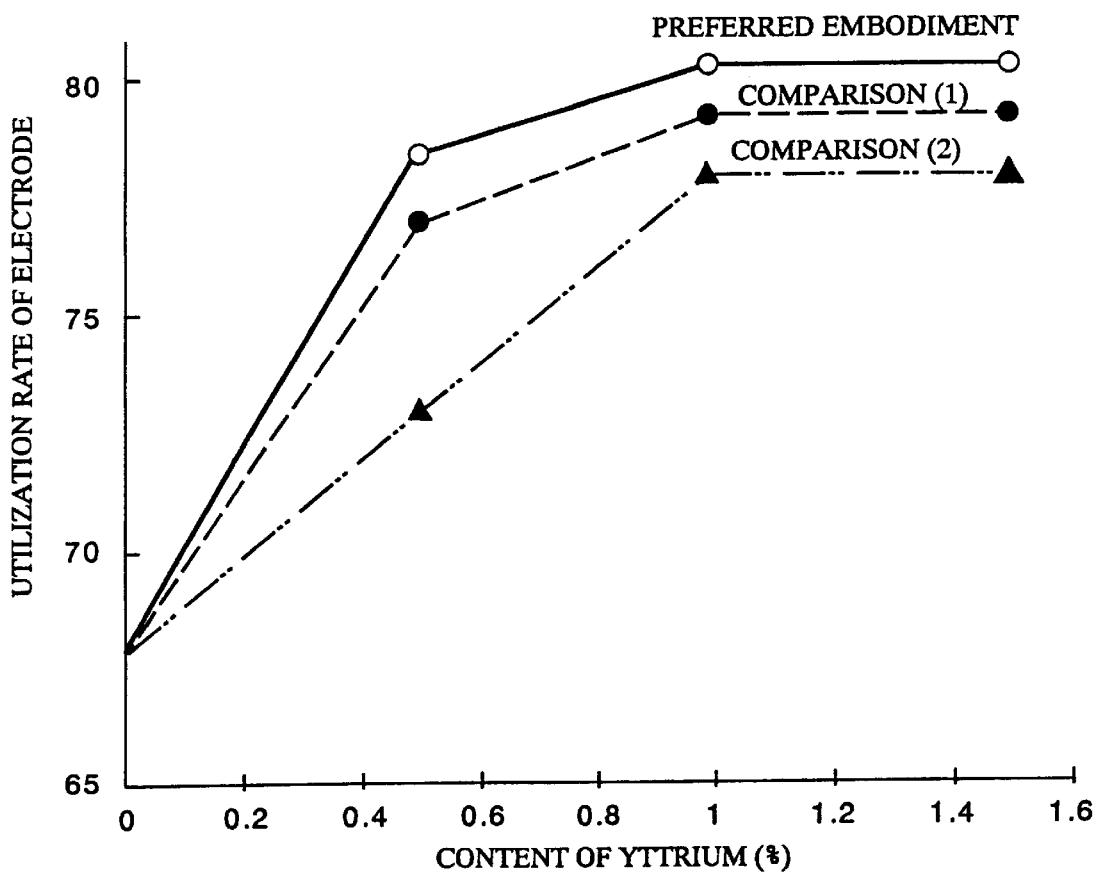

CADMIUM NEGATIVE ELECTRODE FOR ALKALINE STORAGE BATTERY AND MANUFACTURING METHOD OF THE SAME

BACKGROUND OF THE INVENTION

1. Field of the Invention

The present invention relates to a cadmium negative electrode for an alkaline storage battery such as a nickel-cadmium storage battery and a manufacturing method of the same.

2. Description of the Prior Art

As a conventional cadmium negative electrode for a nickel-cadmium storage battery, there have been proposed a sintered type negative electrode fabricated by impregnating an active material such as cadmium oxide or cadmium hydroxide into a porous substrate formed by sintering nickel powder and a paste type negative electrode fabricated by the steps of mixing an active material with synthetic fibers and paste, coating the mixture on a conductive substrate in the form of a punched sheet metal and drying the conductive substrate coated with the mixture. In these negative electrodes, the latter paste type negative electrode is widely used since it can be fabricated at a relatively low cost to provide a storage battery of high energy density.

In an alkaline storage battery equipped with the paste type negative electrode, a large amount of active material can be loaded as compared with an alkaline storage battery equipped with the sintered type negative electrode. The utilization rate of the active material in the storage battery is, however, decreased due to lack of a conductive network for collecting an electric current. To solve the problem, proposed in Japanese Patent Laid-open Publication No. 62(1987)-211862 is an alkaline storage battery added with yttrium oxide powder to enhance the utilization rate of the active material.

In the alkaline storage battery disclosed in Japanese Patent Laid-open Publication No. 62(1987)-211862, however, electrical contact between particles of the cadmium active material becomes insufficient due to particles of the yttrium oxide interposed therebetween. When the yttrium oxide is hydrated in alkaline solution and changed to yttrium hydroxide, an increase in volume of the yttrium hydroxide obstructs electric contact of particles of the cadmium active material. This results in deterioration of the utilization rate and cycle characteristic of the cadmium active material.

To solve such a problem, proposed in Japanese Patent Laid-open Publication No. 3(1991)-192655 is an alkaline storage battery added with yttrium hydroxide to enhance the utilization rate of the cadmium active material. In the alkaline storage battery disclosed in Japanese Patent Laid-open Publication No. 3(1991)-192655, the yttrium hydroxide is preliminarily added to the active material powder mainly comprised of the cadmium oxide. Since the yttrium hydroxide does not increase in volume during hydration, sufficient electrical contact between particles of the cadmium active material is obtained without destroying the matrix of particles of the cadmium active material. Furthermore, as compared with the addition of the yttrium oxide, the yttrium hydroxide is uniformly dispersed in the cadmium active material. For these reasons, the utilization rate and cycle characteristic of the active material are enhanced effectively.

In an alkaline storage battery of this kind, the capacity of the negative electrode is determined more than that of the positive electrode so that a dischargeable capacity remains in the negative electrode when the positive electrode has been fully discharged at the end of discharge. Hereinafter, this is referred to a discharge reserve. Since the dischargeable capacity of the negative electrode is influenced by a discharge rate, a discharge temperature or the like, the capacity of the storage battery is sometimes limited by the capacity of the negative electrode. For this reason, the discharge reserve is taken into consideration to effect stable performance of the storage battery in various discharge conditions.

For the discharge reserve, the cadmium negative electrode in the nickel-cadmium storage battery is partly charged to cause partial reduction of the cadmium hydroxide and is assembled with the storage battery after washing and drying. Alternatively, metallic cadmium powder is added to the cadmium hydroxide or cadmium oxide powder so that the metallic cadmium remains as a non-discharged portion in the negative electrode at the end of discharge of the positive electrode. Hereinafter, the metallic cadmium is referred to an active material in charged state.

In the alkaline storage battery disclosed in Japanese Patent Laid-open Publication No. 3(1991)-192655, however, the active material in charged state is not taken into consideration. In general, the utilization rate of the metallic cadmium contained as the active material in charged state is lower than that of metallic cadmium produced by charge of the cadmium oxide or cadmium hydroxide. For this reason, enhancement of the utilization rate of the active material in the negative electrode containing metallic cadmium as the active material in charged state is limited in a certain extent.

SUMMARY OF THE INVENTION

The present invention was made on a basis of the fact that the utilization ratio of the active material in the negative electrode can be enhanced if the utilization rate of the metallic cadmium to be added as the active material in charged state is increased. It is, therefore, a primary object of the present invention to increase the utilization rate of the metallic cadmium to be added as the active material in charged state.

According to the present invention, there is provided a cadmium negative electrode for an alkaline storage battery containing an active material in charged state, wherein the active material in charged state is comprised of metallic cadmium containing yttrium compound mixed therewith, and wherein a mixture of paste of the charged material in a changed state and; a main active material in the form of cadmium oxide or cadmium hydroxide are deposited on a metallic active material retention substrate. In the cadmium negative electrode, the active material in charged state is useful to decrease an amount of the metallic cadmium which is impossible to discharge thereby to greatly enhance the utilization rate of the cadmium negative electrode. In general, the utilization rate of the metallic cadmium contained as the active material in charged state is lower than that of metallic cadmium produced by charge of cadmium oxide or cadmium hydroxide contained as the main active material. In the case that the yttrium compound is contained in the metallic cadmium as a mixture therewith, the utilization rate of the metallic cadmium is enhanced. This is effective to decrease an amount of non-discharged metallic cadmium and to enhance the utilization rate of all the active materials in the negative electrode thereby to increase the capacity of the alkaline storage battery.

According to the present invention, there is provided a method of manufacturing a cadmium negative electrode for an alkaline storage battery containing an active material in charged state, the manufacturing method comprising the steps of forming a mixture paste of a main active material in the form of cadmium oxide or cadmium hydroxide and an active material in charged state in the form of metallic cadmium containing a yttrium compound mixed therewith, and depositing the mixture paste on a metallic active material retention substrate. With the manufacturing method, an amount of non-discharged metallic cadmium is decreased by mixture of the main active material and the active material in charged state. This is effective to enhance the utilization rate of all the active materials in the negative electrode thereby to increase the capacity of the alkaline storage battery.

BRIEF DESCRIPTION OF THE DRAWINGS

Other objects, features and advantages of the present invention will be more readily appreciated from the following detailed description of a preferred embodiment thereof when taken together with the accompanying drawings, in which:

FIGS. 1(a)–1(c) illustrate a production process of metallic cadmium containing a yttrium compound mixed therewith as an active material in charged state; and FIG. 2 is a graph showing a utilization rate of active materials in a negative electrode in relation to a content of yttrium.

DESCRIPTION OF THE PREFERRED EMBODIMENT a) Production of metallic cadmium containing a yttrium compound mixed therewith as an active material in charged state:

In FIGS. 1(a)–1(c) of the drawings, there are illustrated the steps of producing metallic cadmium containing a yttrium compound mixed therewith used as an active material in charged state. As shown in FIG. 1(a), a mixture 11 of solution containing yttrium salt ($Y^{3+}$) and solution containing cadmium salt ($Cd^{2+}$) was introduced into a container 10, and alkaline solution comprised of sodium hydroxide (NaOH solution of 15 weight %) was introduced into the container 10. Thus, a reaction represented by the following reaction formulae was caused to produce cadmium hydroxide 12 containing yttrium component.

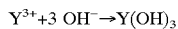

$Y^{3+}+3\ OH^- \rightarrow Y(OH)_3$

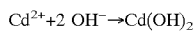

$Cd^{2+}+2\ OH^- \rightarrow Cd(OH)_2$

Subsequently, as shown in FIG. 1(b), reduction metal powder comprised of zinc-metal powder (Zn) was further introduced into the container 10. Thus, a reaction represented by the following reaction formulae was caused to produce metallic cadmium containing a yttrium compound mixed therewith as shown in FIG. 1(c).

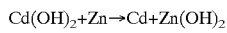

$Cd(OH)_2+Zn \rightarrow Cd+Zn(OH)_2$

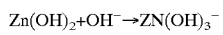

$Zn(OH)_2+OH^- \rightarrow ZN(OH)_3^-$ b) Production of a cadmium negative electrode plate:

80 weight part of cadmium hydroxide was prepared as a main active material, and 20 weight part of metallic cadmium mixed with a yttrium compound was prepared as an active material in charged state in the same manner as described above. 30 weight part of 1 weight % methyl cellulose solution was added to a mixture of the cadmium hydroxide and metallic cadmium and kneaded to prepare an active material paste. The active material paste was coated on a conductive core plate in the form of a punched sheet metal of 0.08 mm in thickness and dried to produce a cadmium negative electrode plate. For producing four kinds of the cadmium negative electrode plates, the amount of yttrium contained in the metallic cadmium was determined to be 0.0weight part, 0.5 weight part, 1.0 weight part and 1.5 weight part respectively relative to 100 weight part of all the cadmium active material in the cadmium negative electrode plate.

c) Production of comparative cadmium negative electrode plates:

Comparison 1:

During the production process of the metallic cadmium, solution containing cadmium salt was used without containing any yttrium salt in stead of the mixture of the solution containing yttrium salt and the solution containing cadmium salt to produce metallic cadmium excluding yttrium component under the same condition as described above. The produced metallic cadmium was used as an active material in preliminarily charged state and added with yttrium hydroxide powder when mixed with paste to produce a comparative cadmium negative electrode plate in the same manner as described above. The yttrium content in the comparative cadmium negative electrode plate was substantially the same as in the preferred embodiment. Namely, the yttrium content was determined to be 0.0 weight part, 0.5 weight part, 1.0 weight part and 1.5 weight part respectively relative to 100 weight part of all the cadmium active material in the cadmium negative electrode plate for producing four kinds of the comparative cadmium negative electrode plates.

Comparison 2:

The metallic cadmium excluding the yttrium component in Comparison 1 was used as an active material in preliminarily charged state, and a mixture of cadmium salt and yttrium salt was added to alkaline solution in stead of 80 weight part of cadmium hydroxide and washed to obtain 80 weight part of cadmium hydroxide containing yttrium hydroxide. Thus, the 80 weight part of cadmium hydroxide was used to produce a cadmium negative electrode plate in the same manner as described above. For producing four kinds of the cadmium negative electrode plates, the yttrium content was determined to be 0.0 weight part, 0.5 weight part, 1.0 weight part and 1.5 weight part respectively relative to 100weight part of all the cadmium active material in the cadmium negative electrode plate.

Experiment:

The four kinds of cadmium negative electrode plates each were cut into a sample electrode plate of 40 ×75 mm. The sample electrode plate was layered on a conventional nickel positive electrode plate of the sintered type through a separator of nylon in such a manner that both the electrode plates are opposed to one another. The layered electrode plates were put into a polyethylene bag and pressed at their opposite faces. Thereafter, an amount of potassium hydroxide solution of 1.23 specific gravity was introduced into the polyethylene bag to produce a test cell.

The test cell was charged with an electric current of 0.1 C relative to a theoretical capacity of the electrodes for twelve hours. Thereafter, the test cell was discharged with an electric current of 0.3 C until the potential of the test cell becomes +0.0 V relative to a mercury oxide reference electrode. The charge and discharge of the test cell were repeated at a cycle. After five cycles of the charge and discharge, each capacity of the test cells was measured. Thus, each utilization rate of the test cells was calculated on a basis of the following equation and represented as shown in a graph of FIG. 2.

Utilization rate (%) =Measured capacity/Theoretical capacity ×100 (%)

As is understood from the graph of FIG. 2, the utilization rate of the active material in the test cell containing cadmium hydroxide as a main active material and added with the metallic cadmium containing a yttrium compound mixed therewith as an active material in charged state is enhanced more than that in the test cell added with the yttrium hydroxide powder when mixed with the paste or in the test cell added with cadmium hydroxide containing yttrium hydroxide.

As is understood from the above description, the utilization rate of the metallic cadmium is enhanced by containing yttrium hydroxide as the yttrium compound into the active material in charged state in the form of metallic cadmium thereby to enhance the utilization rate of all the active materials in the negative electrode and to increase the capacity of the alkaline storage battery.

What is claimed is:

1. A cadmium negative electrode for an alkaline storage battery containing an active material in charged state, wherein the active material in charged state is comprised of metallic cadmium containing yttrium hydroxide mixed therewith, and wherein a mixture paste of the active material in charged state and a main active material in the form of cadmium oxide or cadmium hydroxide is deposited on a metallic active material retention substrate, and wherein the metallic cadmium containing the yttrium hydroxide is produced by introducing a Yttrium salt and a cadmium salt into an alkaline solution and reducing cadmium hydroxide to metallic cadmium with ZN as a reducing agent.

2. A method of manufacturing a cadmium negative electrode for an alkaline storage battery containing an active material in a charged state, comprising the steps of:

(1) forming a mixture paste of a main active material in the form of cadmium oxide or cadmium hydroxide and metallic cadmium containing yttrium hydroxide mixed therewith; and (2) depositing the mixture paste on a metallic active material retention substance, wherein the metallic cadmium containing the yttrium hydroxide is produced by introducing a yttrium salt and a cadmium salt into an alkaline solution and reducing cadmium hydroxide to metallic cadmium with Zn as a reducing agent.

3. A method of manufacturing a cadmium negative electrode as claimed in claim 2, wherein the metallic cadmium containing the yttrium power is produced by introducing yttrium salt and cadmium salt into alkaline solution and reacting a reduction agent in the form zinc of powder for reduction of cadmium ion with the yttrium salt and cadmium salt in the alkaline solution.

* * * * *